United States Patent [19]

Janczak et al.

[11] Patent Number: 5,037,546
[45] Date of Patent: Aug. 6, 1991

[54] PERMANENT MAGNETIC POWER CELL CIRCUIT FOR TREATING FLUIDS TO CONTROL MINERAL SCALE AND SCALE-INDUCED CORROSION IN PIPES AND FLUID FLOW SYSTEMS

[75] Inventors: Andrew Janczak, Massapequa, N.Y.; Edward Krensel, Philadelphia, Pa.

[73] Assignee: Enecon Corporation, Wantagh, N.Y.

[21] Appl. No.: 533,347

[22] Filed: Jun. 5, 1990

[51] Int. Cl.$^5$ ................................................. C02F 1/48
[52] U.S. Cl. ................................. 210/222; 210/695; 55/100
[58] Field of Search ............... 210/222, 695; 55/1, 55/2, 100; 123/536, 538; 335/304, 306

[56] References Cited

U.S. PATENT DOCUMENTS

| | | | |
|---|---|---|---|
| 438,579 | 10/1890 | Faunce et al. | 210/222 |
| 531,183 | 12/1894 | Harris | 210/222 |
| 2,652,925 | 9/1953 | Vermeiren | 210/222 |
| 3,228,878 | 1/1966 | Moody | 210/222 |
| 4,151,090 | 4/1979 | Brigante | 210/222 |
| 4,265,746 | 5/1981 | Zimmerman, Sr. et al. | 210/222 |
| 4,367,143 | 1/1983 | Carpenter | 210/222 |
| 4,605,498 | 8/1986 | Kulish | 210/222 |

FOREIGN PATENT DOCUMENTS 126815  3/1959  U.S.S.R. ............................ 210/222

Primary Examiner—Robert A. Dawson
Assistant Examiner—Matthew O. Savage
Attorney, Agent, or Firm—Laurence R. Brown

[57] ABSTRACT

For better efficiency in removing scale and deposits in pipes, a high gauss permanent magnet unit, requiring no servicing or external power, mounts on the exterior surface of the pipes for establishing a flux path encompassing a greater portion of the flow path than heretofore feasible. Even more effectiveness results from mounting units in diametrically opposed pairs. The units have a pair of alnico magnetic plates straddling an arc on the pipe surface to focus the magnetic flux into a preferred pattern into the fluid flow path. By blending two permanent magnetic circuit paths from different permanent magnetic materials offering different advantages, a multi-pole, multi-axial magnetic flux generator uniquely distributes and concentrates the magnetic forces for maximum de-scaling effect. Standard units fit different diameter pipes, provide very high fluid treatment flux concentrations over a wide range of pipe cross section area and have long life in the presence of magnetic interference or electrical shock.

6 Claims, 2 Drawing Sheets

PERMANENT MAGNETIC POWER CELL CIRCUIT FOR TREATING FLUIDS TO CONTROL MINERAL SCALE AND SCALE-INDUCED CORROSION IN PIPES AND FLUID FLOW SYSTEMS

TECHNICAL FIELD

This invention relates to the control of scale and corrosion in fluid flow pipes by means of magnetic fields and more particularly it relates to permanent magnet units mountable outside a pipe for producing magnetic flux in the fluid flow path within the pipe.

BACKGROUND ART

The role of magnetic flux in preventing scale on pipes has long been known, as evidenced by U.S. Pat. No. 438,579 dated Oct. 14, 1890, A.. Faunce, et al. Electromagnets for such purposes are represented by U.S. Pat. Nos. 531,183, Dec. 18, 1894, J. Harris; 2,652,925, Sept. 22, 1953, T. Vermeiren and 4,151,090, April 24, 1979, M. Brigante. Such systems are difficult to install and maintain, requiring electrical current connections and creating magnetic disturbances to sensitive electronic equipment in the vicinity.

Thus, permanent magnet configurations have been introduced such as set forth in U.S. Pat. Nos. 3,228,878, Jan. 11, 1966, D. Moody; and 4,367,143, Jan. 4, 1983, R. Carpenter. In these devices, longitudinally oriented magnets have a flux passing between north and south poles in narrow slice like flux paths that encompass only small portions of the cross section area inside the pipe, so that only portions of the passing fluid are subjected to the magnetic flux.

U.S. Pat. No. 4,605,498, Aug. 12, 1986, P. Kulish provides a magnet array encircling the pipe circumference and magnetized to present opposite poles radially from the outer pipe circumference to outer magnet circumference. This construction is quite ineffective and introduces significant problem in adaption to pipes already installed or those with limited accessibility. For example, a different model of magnet must be custom built for close fit with every different pipe size. With large pipe sizes of six inches (15 cm) or more in diameter such magnets are impractical, very large and very expensive. Furthermore heavy flux concentrations necessary for proper fluid treatment are not feasible with this construction. The major flux path between north and south poles is thus directed in air outside the pipe and is ineffective in establishing a concentrated working flux within the fluid.

Accordingly it is an objective of this invention to improve the art of permanent magnetic flux scale and corrosion control devices, and resolve these prior art problems.

DISCLOSURE OF THE INVENTION

This invention provides universal type permanent magnetic flux scale control units adaptable to different pipe sizes, which may be retrofit at available pipe locations, even in cramped quarters. They provide improved high flux concentration within a larger working space area than feasible with prior art units, by means of separated pole pairs in each unit of very high gauss alnico permanent magnets. Thus, in essence the flux is focussed over a sectorial pattern of flux distribution within the pipe so that a ring of units about the pipe will assure almost complete coverage of the cross section area of fluid flow within the pipe with a high density magnetic flux field.

Long life and adaptability to conditions where vibration and shock are present is improved by means of two shunt permanent magnetic paths acting in unison. Thus, an auxiliary path of ceramic ferrite permanent magnet material serves as a reservoir for the high gauss alnico flux field to prevent its discharge in the presence of sporadic vibration or shock, and an assurance of an acceptably high maintenance flux over a long life period.

Other features, advantages and objects of the invention will be found throughout the following description, claims and accompanying drawings.

BRIEF DESCRIPTION OF THE DRAWINGS

Like reference characters are used to identify similar features for facilitating comparison throughout the several views of the drawing, in which.

THE PREFERRED EMBODIMENT

Figure 1:
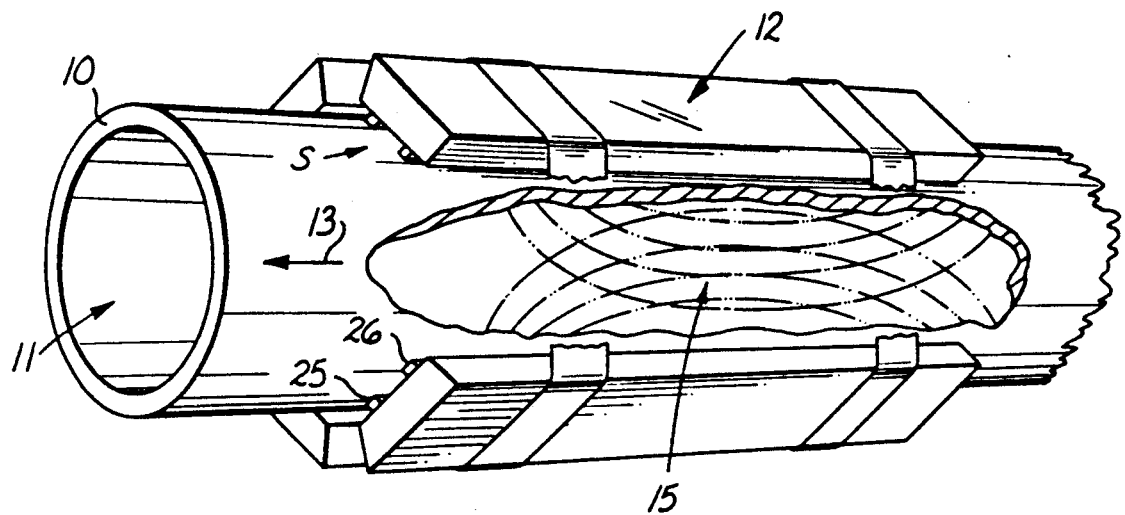
FIG. 1 is a perspective fragmental view, partly broken away, of a corroded pipe scale control embodiment illustrating the operation of the invention.

As may be seen from FIG. 1, the pipe 10 has a fluid flow therein in the direction of arrow 13, which has resulted in deposits 11 of scale, etc. For removal and prevention of such scale, a plurality of corrosion treatment magnetic units 12 are arranged about the outer circumference of the pipe 10 for generation of a magnetic flux pattern 15 in the fluid flow path, which serves as means for controlling scale and corrosion. Each unit 12 is adapted to rest on the outer pipe circumference for creating a longitudinally oriented magnetic flux pattern 15 along a length of the fluid flow path. A ten inch (25 cm) diameter pipe such as depicted, then would have three pairs of diametrically opposed units mounted to substantially saturate the entire fluid flow cross section inside the pipe with magnetic flux.

Note that these single units of a single size have a wide range of adaptability to pipe sizes from one inch (2.5 cm) to very large diameters. Preferably an even number of units are arranged in diametrically opposed pairs with the individual units spaced equally apart on the outer circumferenc. A typical size for these units is about six inches (15 cm) long and about two inches (5 cm) wide. The south pole S is oriented downstream in the flow path 13.

Figure 2:
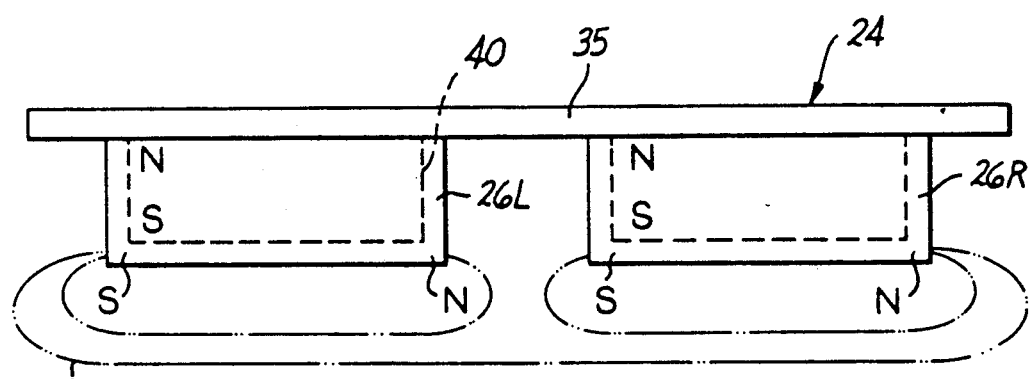
FIG. 2 is a side view of a double tiered flux treatment unit embodiment of the invention, FIG. 3 an end view, and FIG. 4 a bottom view of a single unit.
Figure 3:
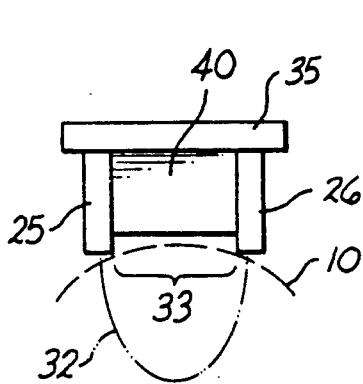
Figure 4:
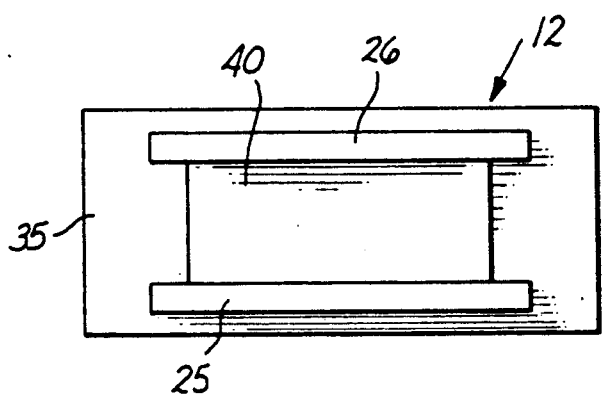

As may be seen from FIGS. 2 to 4, the assembly may be a single unit 12 (FIG. 4) or a pair of longitudinally cascaded units 24 (FIG. 1). The latter dual unit is preferable whenever larger pipe diameters are involved (over 2") or any turbulence is possible in the flow path to assure that the fluid flows the full available length through a significant length of the available flux pattern for treatment.

The units 12 or assemblies 24 are made up of suitably packaged magnetic arrays having two spaced substantially rectangular alnico magnetic plates 25, 26, with a residual gause in the order of 12,000 and with magnetic polarity from N to S positioned toward the flow path (13 FIG. 1), and respectively extended as legs for contact with the outer circumference of pipe 10, straddling the arc 33 and serving to focus the very high gauss magnetic flux 30 in a rather sectorial pattern 32 encompassing a significant part of the cross section area of the fluid flow path within the pipe. Thus, magnets 25 and 26 are polarized with north and south poles as shown in FIG. 2 aligned in a direction parallel to the axis of the pipe 10 in FIG. 1.

The low reluctance soft iron or equivalent non-permanent magnetic cover plate 35 which as seen from FIG. 4 spans both pairs of permanent magnets, serves as a return path for the longitudinally oriented alnico magnet poles (N, S), at the upper side of the magnets 25, 26. Accordingly at the lower side, the flux pattern 30 is established for intrusion within the pipe 10.

Two substantially cubic ceramic ferrite permanent magnets 40, 41 with a residual gauss in the order of 4000 are normally disposed between the alnico magnets 25, 26 and with north poles in contact with the low reluctance cover plate 35, to leave the alnico legs for straddling the pipe 10 extending from the bottom, as shown.

Figure 5:
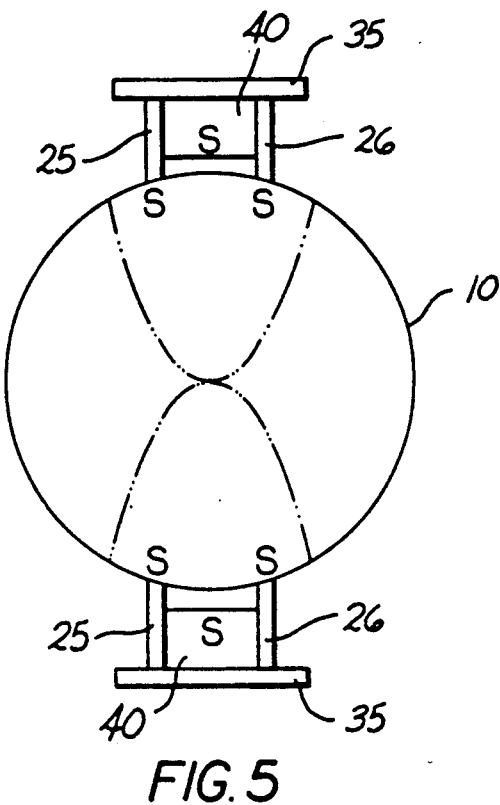
FIGS. 5 and 6 are respectively end view and side view section sketches of one pair of units diametrically opposed on opposite sides of a pipe illustrating typical flux patterns.
Figure 6:
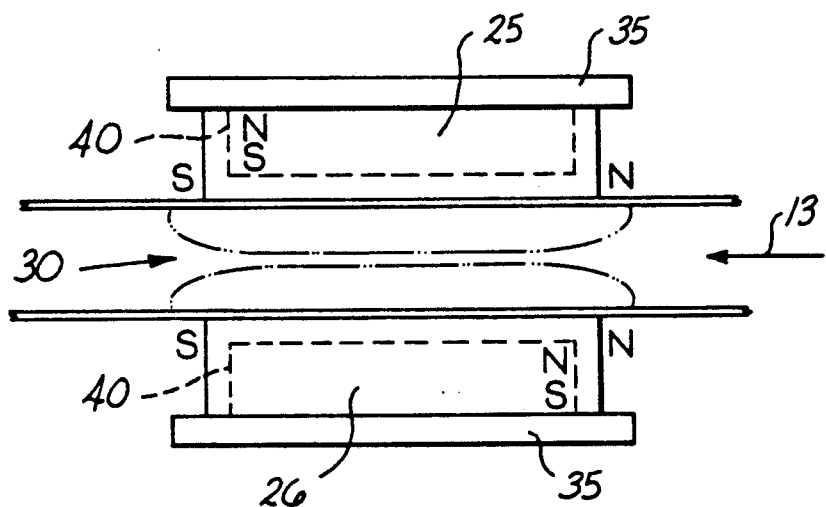

The cooperative relationship of the assemblies is better seen from FIGS. 5 and 6. In FIG. 5, the diametrically opposed preferable disposition of two units is illustrated. Thus the repellant reaction of magnetic flux lines from the respective units near the center of the pipe 50 provides a better distribution of flux over a larger cross section of the fluid flow path.

In FIG. 6, it is readily seen that the magnetic circuit 40, 35, 41 formed by the ceramic ferrite permanent magnets shunts the magnetic circuit formed by the alnico magnets 25, 26. This serves several purposes. For one thing, there is a preferred defined outer radial (as seen from the pipe) stray flux path defined to reduce external fields, and to concentrate any stray flux longitudinally oriented to the pipe from the alnico north and south poles to penetrate the fluid flow path. For another two different kinds of magnets may be used for their preferred characteristics. The alnico magnets provide higher gauss magnetic fields. The ceramic magnets provide longer life in the presence of shock vibration and strong stray external magnetic fields. Thus, longer term life is assured than with the sole use of alnico magnets. In essence the cooperative effort is such that upon a sharp impact or strong electrical current from a lightning bolt, for example, that tended to shock the alnico magnets, the shunted ceramic magnets serve as a temporary storage reservoir resisting the demagnetization of the alnico magnets. Accordingly the disclosed combination of magnetic elements provides considerable advantage in the task of controlling scale in a fluid flow path.

It is seen therefore, that the novel magnetic units afforded by this invention provide longer life, higher magnetic flux concentrations, larger effective treatment areas and adaptability of a standard unit to different pipe sizes.

Having therefore advanced the state of the art, those novel features descriptive of the nature and spirit of the invention are set forth with particularity in the following claims.

We claim:

1. In a dynamic magnetic fluid flow treatment system for controlling scale and deposits having a set of permanent magnetic cells for surrounding a cylindrical pipe defining a fluid flow passageway, wherein the permanent magnetic cells comprise in combination:

a cylindrical pipe having a longitudinal axis;

a pair of parallel spaced apart longitudinally disposed alnico permanet magnet plate members polarized in a direction parallel to the longitudinal axis of said pipe;

ceramic ferrite permanent magnets positioned respectively near the N and S poles of and between the alnico plate members to extend substantially perpendicular to the longitudinal axis of said pipe, the ferrite permanent magnets being polarized in a direction perpendicular to the longitudinal axis of said pipe; and a low reluctance not permanently magnetizable magnetic circuit plate member disposed substantially parallel to said pipe spanning the two alnico plate members and disposed longitudinally over the length of the alnico magnet members and adjacent a N pole of the ferrite permanent magnets;

all magnets and the magnetizable plate member being assembled as a single unit with the two alnico plate members providing a pair of extending legs straddling an arc on said cylindrical pipe and respectively abutting the pipe along their length to induce inside the pipe a generally longitudinally oriented magnetic flux pattern encompassing substantially a sectorial area through which fluid flows.

2. The treatment system of claim 1 further comprising, a set of said units disposed about said pipe in diametrically opposed pairs.

3. The treatment system of claim 1 further comprising a set of two said cells longitudinally disposed along said pipe having a common single said low reluctance plate disposed along the length of the two units.

4. A magnetic unit for magnetic treatment of scale and sediment in a fluid flow pipe comprising in combination: a pipe having a longitudinal axis, a pair of spaced apart parallel permanent magnet plates packaged to be located as a unit to dispose the plates substantially parallel to the longitudinal axis of said pipe and in contact therewith to straddle an arc on the exterior of the pipe with said magnet plates being polarized in a direction parallel to the longitudinal axis of the pipe to direct a longitudinally disposed magnetic flux pattern extending between the two parallel plates into the pipe to produce a flux pattern in a substantially sector shaped cross section of area within the pipe;

said magnets formed substantially as two parallel rectangular plates with a low reluctance non permanent magnetic plate disposed along the pipe and bridging the permanent magnet plates at a position radially external to the pipe surface with the magnetic plates extending therefrom as legs directed toward an outer surface of the pipe to straddle said arc; and, a further pair of permanent magnet ceramic ferrite blocks disposed at opposite poles of and between the rectangular plates and in contact with the low reluctance plate and polarized in a direction perpendicular to the longitudinal axis of said pipe with the S poles directed toward the pipe.

5. The magnetic unit of claim 4 wherein the rectangular plate magnets and the permanent magnet blocks constitute respectively alnico and ceramic ferrite magnetic materials.

6. The magnetic unit of claim 5 wherein the rectangular plate magnets are alnico having a high residual gauss in the order of 12,000 and the ceramic ferrite blocks have a residual gauss in the order of 4000 and the property of long time retentivity of its maximum gauss under varying conditions of time, magnetic influence and physical shock.

* * * * *